United States Patent
Lin (10) Patent No.: US 9,264,920 B2
(45) Date of Patent: Feb. 16, 2016

(54) NETWORK MANAGING METHOD AND DEVICE FOR WIRELESS NETWORK SYSTEM

(71) Applicant: Wistron NeWeb Corporation, Hsinchu (TW)

(72) Inventor: Yung-Cheng Lin, Hsinchu (TW)

(73) Assignee: Wiston NeWeb Corporation, Hsinchu Science Park, Hsinchu (TW)

( * ) Notice: Subject to any disclaimer, the term of this patent is extended or adjusted under 35 U.S.C. 154(b) by 160 days.

(21) Appl. No.: 14/188,700

(22) Filed: Feb. 25, 2014

(65) Prior Publication Data

US 2015/0078199 A1   Mar. 19, 2015

(30) Foreign Application Priority Data

Sep. 17, 2013 (TW) .............................. 102133624 A (51) Int. Cl.
  *H04W 24/02* (2009.01)
  *H04W 64/00* (2009.01)
  *G01S 5/14* (2006.01)

(52) U.S. Cl.
  CPC ................. *H04W 24/02* (2013.01); *G01S 5/14* (2013.01); *H04W 64/00* (2013.01)

(58) Field of Classification Search
  None
  See application file for complete search history.

(56) References Cited

U.S. PATENT DOCUMENTS

| 7,764,231 | B1 * | 7/2010 | Karr et al. ..................... 342/457 |
| 7,860,516 | B2 * | 12/2010 | Hodges et al. ............. 455/456.1 |
| 7,970,411 | B2 | 6/2011 | Pande |
| 2005/0037775 | A1 * | 2/2005 | Moeglein et al. .......... 455/456.1 |
| 2009/0016279 | A1 * | 1/2009 | Beser ............................. 370/329 |
| 2010/0135178 | A1 | 6/2010 | Aggarwal |
| 2012/0054302 | A1 * | 3/2012 | Priyadarshan et al. ....... 709/217 |
| 2013/0053056 | A1 | 2/2013 | Aggarwal |
| 2013/0072230 | A1 * | 3/2013 | Bansal et al. .............. 455/456.2 |
| 2013/0170374 | A1 * | 7/2013 | Aljadeff ....................... 370/252 |

FOREIGN PATENT DOCUMENTS

| TW | 200948127 | 11/2009 |
| TW | 201334600 | 8/2013 |

* cited by examiner

*Primary Examiner* — Hicham Foud (74) *Attorney, Agent, or Firm* — Winston Hsu; Scott Margo (57) ABSTRACT

A network managing method is utilized for a wireless network system. The wireless network includes multiple wireless access equipments and multiple user equipments. The method uses the wireless access equipments to measure a plurality of echo back time of the user equipments to obtain multiple measurement results, determines locations of the user equipments according to the measurement results and locations of the wireless access equipments, and adjusts wireless operations from the wireless access equipments to the user equipments according to the locations and priorities of the user equipments.

18 Claims, 9 Drawing Sheets

NETWORK MANAGING METHOD AND DEVICE FOR WIRELESS NETWORK SYSTEM

BACKGROUND OF THE INVENTION

1. Field of the Invention

The present invention relates to a network managing method and a network managing device for a wireless network system, and more particularly, to a network managing method and a network managing device capable of adaptively providing wireless services for user equipments in a wireless network system to provide a convenient network environment.

2. Description of the Prior Art

With advances in wireless communication technology, a portable wireless device, such as a notebook, a personal digital assistant (PDA), a tablet, a smart phone, etc., has become an essential device for people in work or in life, and a user may simultaneously carry or use multiple potable wireless devices. Under such a condition, how to manage operations of the multiple portable wireless devices in a wireless network system becomes one of the industry goals.

SUMMARY OF THE INVENTION

It is therefore an objective of the present invention to provide a network managing method and a network managing device for a wireless network system to improve disadvantages of the prior art, so as to provide a convenient network environment.

The present invention discloses a network managing method for a wireless network system, wherein the wireless network system comprises a plurality of wireless access equipments and at least one user equipment. The network managing method comprises the plurality of wireless access equipments measuring a plurality of echo back time of the at least one user equipment to obtain a plurality of measurement results; determining locations of the at least one user equipment according to the plurality of measurement results and locations of the plurality of wireless access equipments; and adjusting wireless operations from the plurality of wireless access equipments to the at least one user equipment according to the locations and priorities of the at least one user equipment.

The present invention further discloses a network managing device for a wireless network system, wherein the wireless network system comprises a plurality of wireless access equipments and at least one user equipment. The network managing device comprises a processor; and a memory for storing a program code to manage the wireless network system, wherein the program code instructs the processor to perform following steps: controlling the plurality of wireless access equipments to measure a plurality of echo back time of the at least one user equipment to obtain a plurality of measurement results; determining locations of the at least one user equipment according to the plurality of measurement results and locations of the plurality of wireless access equipments; and adjusting wireless operations from the plurality of wireless access equipments to the at least one user equipment according to the locations and priorities of the at least one user equipment.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 to FIG. 7C are schematic diagrams of operating situations of the wireless network system in FIG. 1.

DETAILED DESCRIPTION

Figure 1:
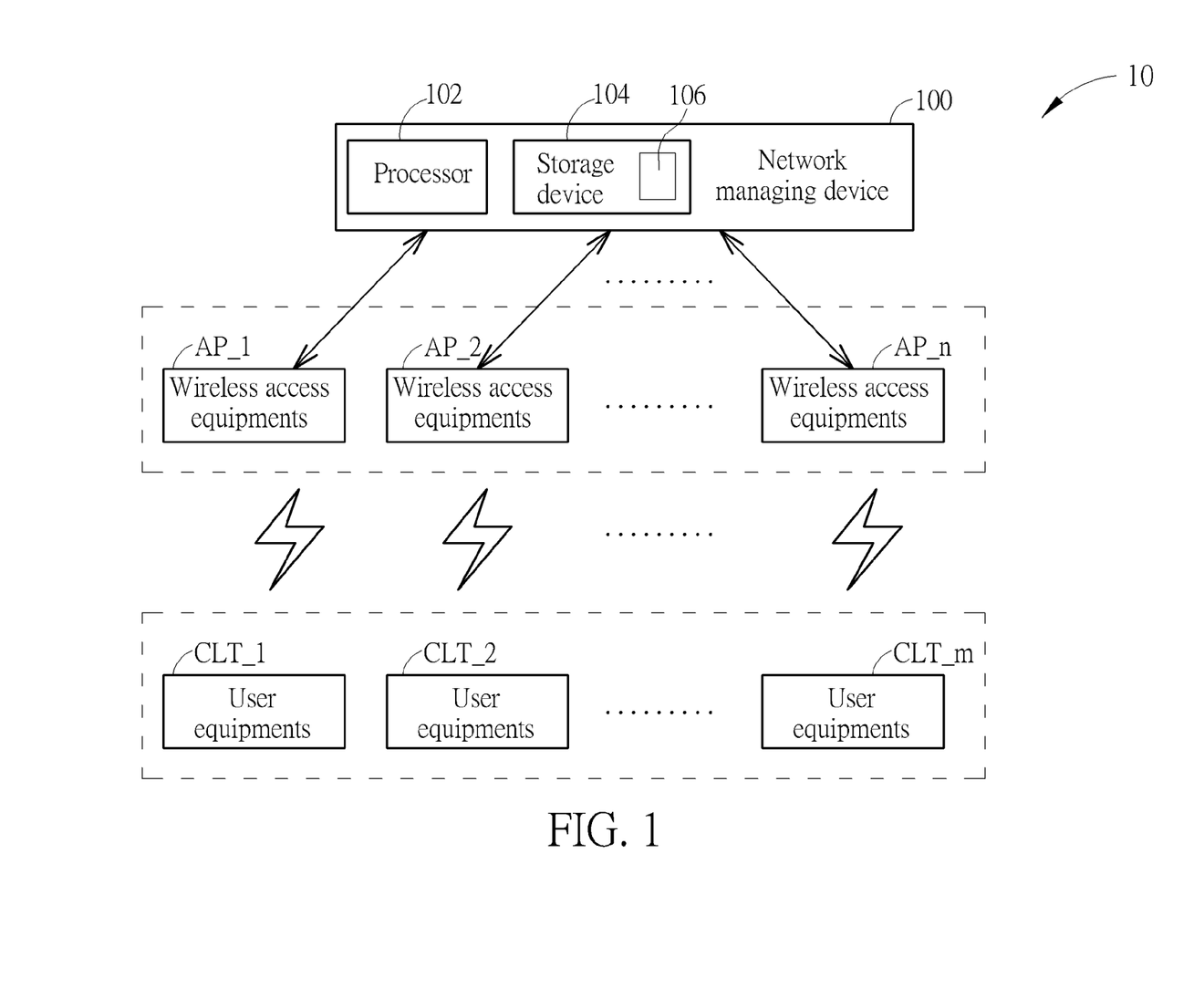
FIG. 1 is a schematic diagram of a wireless network system according to an embodiment of the present invention.

Please refer to FIG. 1, which is a schematic diagram of a wireless network system 10 according to an embodiment of the present invention. The wireless network system 10 includes wireless access equipments $AP\_1$-$AP\_n$, user equipments $CLT\_1$-$CLT\_m$, and a network managing device 100. The wireless access equipments $AP\_1$-$AP\_n$ may be access points adapted to a wireless network and are not limited hereinafter. The wireless access equipments $AP\_1$-$AP\_n$ may perform data exchanges with the user equipments $CLT\_1$-$CLT\_m$ by a wireless transmission method, such that the user equipments $CLT\_1$-$CLT\_m$ may access an Intranet, Internet, etc. The network managing device 100 includes a processor 102 and a storage device 104. The processor 102 may be a microprocessor or an application-specific integrated circuit (ASIC). The storage device 104 may be any one data storage device. For example, the storage device 104 may be a read-only memory (ROM), a random-access memory (RAM), a CD-ROMs, a magnetic tapes, a floppy disks, an optical data storage devices, etc., which is not limited hereinafter. Additionally, a program code 106 is stored in the storage device 104 to instruct the processor 102 to receive echo back time measured by the wireless access equipments $AP\_1$-$AP\_n$ and to control wireless operations of the wireless access equipments $AP\_1$-$AP\_n$ accordingly.

Figure 2:
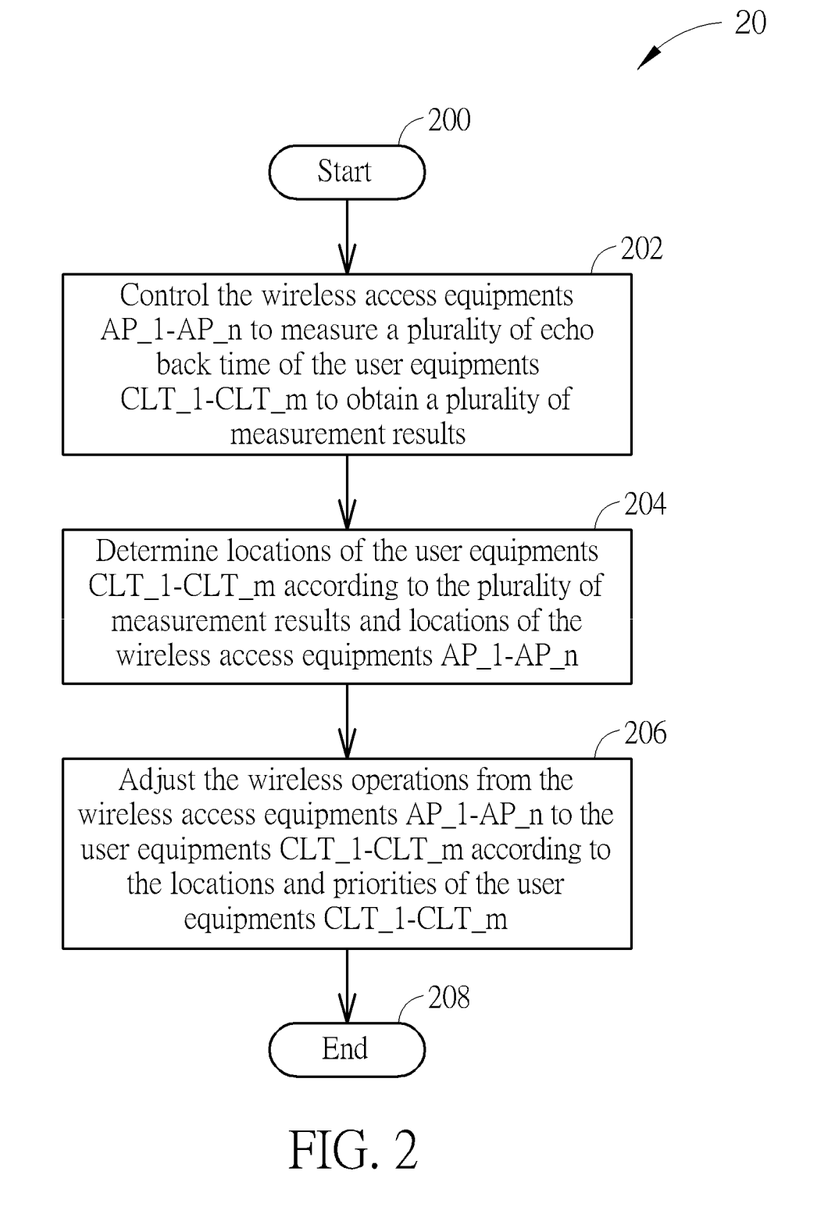
FIG. 2 is a schematic diagram of a network managing process according to an embodiment of the present invention.

Specifically, please refer to FIG. 2, which is a schematic diagram of a network managing process 20 according to an embodiment of the present invention. In the embodiment, the network managing process 20 is performed in the network managing device 100 in FIG. 1 and the network managing process 20 may be compiled as the program code 106, which is stored in the storage device 104 to control the processor 102 to perform the network managing process 20. As shown in FIG. 2, the network managing process 20 includes the following steps:

Step 200: start.

Step 202: control the wireless access equipments $AP\_1$-$AP\_n$ to measure a plurality of echo back time of the user equipments $CLT\_1$-$CLT\_m$ to obtain a plurality of measurement results.

Step 204: determine locations of the user equipments $CLT\_1$-$CLT\_m$ according to the plurality of measurement results and locations of the wireless access equipments $AP\_1$-$AP\_n$.

Step 206: adjust the wireless operations from the wireless access equipments $AP\_1$-$AP\_n$ to the user equipments $CLT\_1$-$CLT\_m$ according to the locations and priorities of the user equipments $CLT\_1$-$CLT\_m$.

Step 208: end.

Thus, according to the network managing process 20, the network managing device 100 controls the wireless access equipments AP_1-AP_n to measure the plurality of echo back time of the user equipments CLT_1-CLT_m to accordingly determine the locations of the user equipments CLT_1-CLT_m. Then, the network managing device 100 adjusts the wireless operations from the wireless access equipments AP_1-AP_n to the user equipments CLT_1-CLT_m based on both the priorities and the locations of the user equipments CLT_1-CLT_m. Under such a situation, the wireless access equipments AP_1-AP_n may provide proper wireless services for the user equipments CLT_1-CLT_m according to the locations and the priorities of the user equipments CLT_1-CLT_m.

In detail, in step 202, the plurality of echo back time of the user equipments CLT_1-CLT_m measured by the wireless access equipments AP_1-AP_n may be periods between the wireless access equipments AP_1-AP_n outputting beacons to the user equipments CLT_1-CLT_m and the wireless access equipments AP_1-AP_n receiving response signals corresponding to the beacons from the user equipments CLT_1-CLT_m. In other words, since a required time of a signal transmission is related to a distance between a transmitter and a receiver, the network managing device 100 may determine the distances from each user equipment to corresponding neighbor wireless access equipments according to the plurality of echo back time of the user equipments CLT_1-CLT_m to obtain the locations of the user equipments CLT_1-CLT_m by utilizing a triangulation method in step 204.

Figure 3:
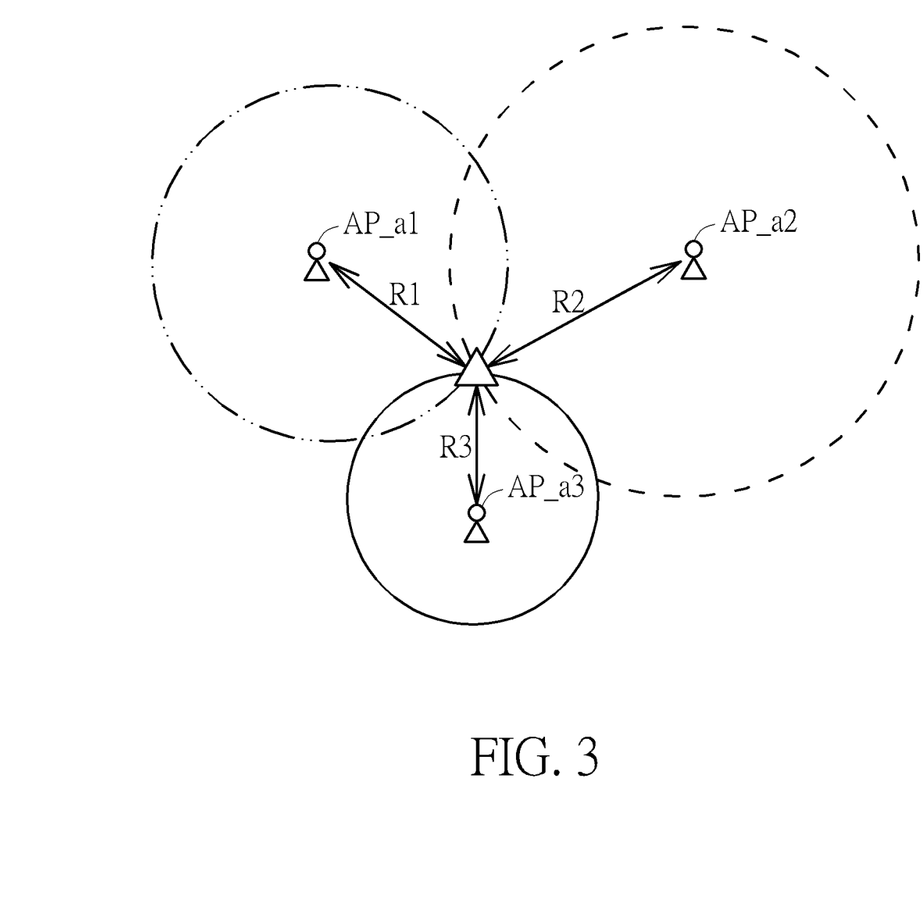
FIG. 3 is a schematic diagram of a principle of a triangulation method utilized for the network managing process in FIG. 2.

The principle of the triangulation method is shown in FIG. 3. A user equipment CLT_a may receive the beacons respectively outputted from the wireless access equipments AP_a1, AP_a2, and AP_a3, and then the user equipment CLT_a outputs the response signals to the wireless access equipments AP_a1, AP_a2, and AP_a3. When the wireless access device AP_a1 outputs the beacon to the user equipment CLT_a and receives the corresponding response signal from the user equipment CLT_a, the wireless access device AP_a1 may obtain the echo back time of the user equipment CLT_a, which is related to the location of the user equipment CLT_a. Then, the network managing device 100 may determine that the user equipment CLT_a is roughly located on a circle with a center at the wireless access equipment AP_a1 and with a radius R1. Accordingly, the network managing device 100 may also determine that the user equipment CLT_a is roughly located on a circle with a center at the wireless access equipment AP_a2 and with a radius R2, and on a circle with a center at the wireless access equipment AP_a3 and with a radius R3. Thus, the network managing device 100 may determine that the user equipment CLT_a is roughly located at an intersectional point of the circles with the radiuses R1, R2, and R3, and the network managing device 100 may determine the location of the user equipment CLT_a according to the locations of the wireless access equipments AP_a1, AP_a2, and AP_a3.

Notably, FIG. 3 is utilized for explaining the principle of the triangulation method and is not to limit the scope of the present invention. For example, the network managing device 100 is not limited to determine the location of the user equipment by utilizing three wireless access equipments, and the network managing device 100 may also determine the location of the user equipment by utilizing more than three wireless access equipments to enhance the accuracy of determination.

Next, in step 206, after the network managing device 100 determines the locations of the user equipments CLT_1-CLT_m, the network managing device 100 further adjusts the wireless operations of the wireless access equipments AP_1-AP_n according to the priorities of the user equipments CLT_1-CLT_m, such as adjusting beam-forming methods and mesh routing methods of the wireless access equipments AP_1-AP_n.

Figure 4:
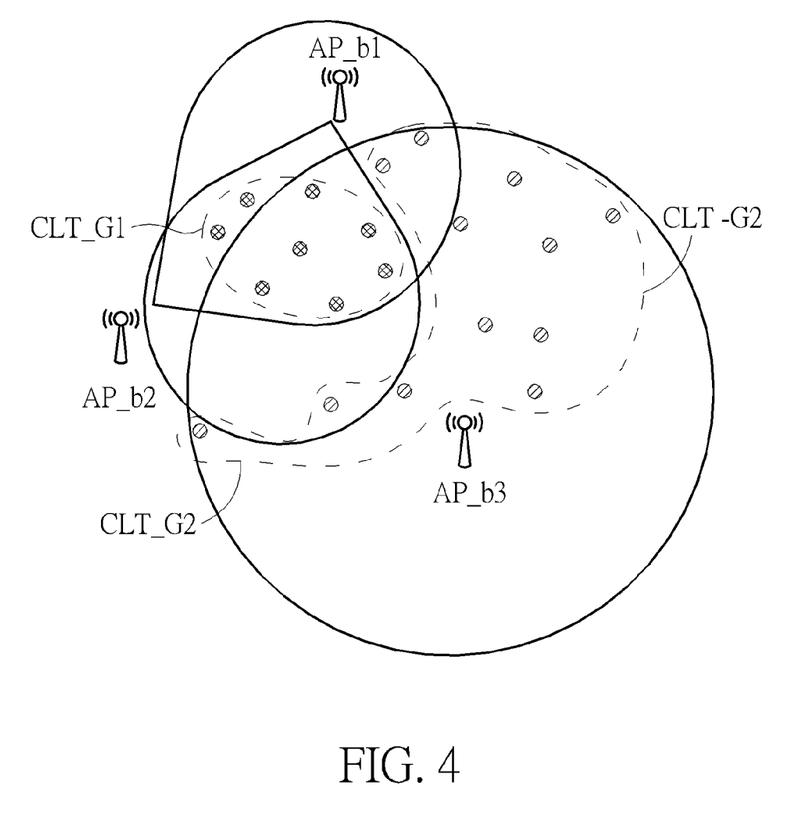

For example, in an embodiment, as shown in FIG. 4, wireless access equipments AP_b1, AP_b2, and AP_b3 in the wireless access equipments AP_1-APn provide the wireless services for user equipment groups CLT_G1 and CLT_G2 of the user equipments CLT_1-CLT_m, and a priority of the user equipment group CLT_G1 is greater than a predefined degree or greater than a priority of the user equipment group CLT_G2. Then, according to the embodiment of the present invention, the network managing device 100 may control the wireless access equipments AP_b1 and AP_b2 to adjust the beam-forming methods according to the location of the user equipment group CLT_G1, such that the wireless signal beams of the wireless access equipments AP_b1 and AP_b2 may substantially point toward the user equipment group CLT_G1 to prioritize providing the wireless services for the user equipment group CLT_G1. In addition, the network managing device 100 controls the wireless access equipments AP_b3 to maintain the wireless operation with all directions to ensure normal operations of wireless communication.

Figure 5:
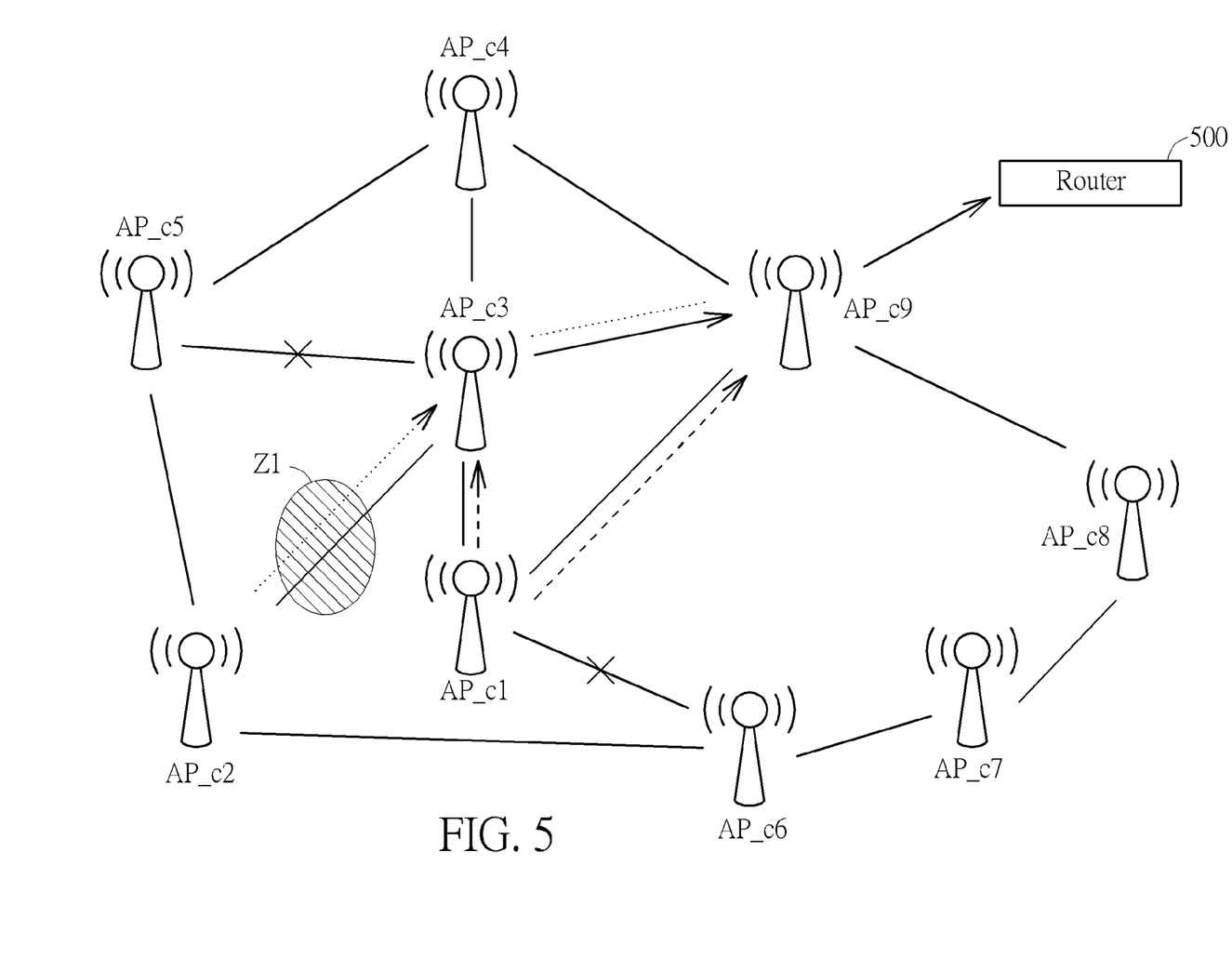

In another embodiment, the network managing device 100 may further adjust the mesh routing methods of the wireless access equipments AP_1-AP_n. As shown in FIG. 5, for simplicity, only the wireless access equipments AP_c1-AP_c9 in the wireless access equipments AP_1-AP_n are described in FIG. 5. The wireless access equipments AP_c1-AP_c9 are connected to a router 500 of an external network, and a user equipment with higher priority is in a region Z1. Thus, the network managing device 100 adjusts the beam-forming methods of the wireless access equipments AP_c1 and AP_c2 to prioritize providing the wireless services for the user equipment in the region Z1. Additionally, for ensuring that the user equipment in the region Z1 may preferentially perform data exchanges via the router 500, the network managing device 100 further increases the routing priority of the path from the wireless access equipment AP_c1 to the wireless access equipment AP_c9 (i.e. the dashed line path in FIG. 5) and the path from the wireless access equipment AP_c2 through the wireless access equipment AP_c3 to the wireless access equipment AP_c9 (i.e. the dotted line path in FIG. 5). Moreover, the path from the wireless access equipment AP_c6 to the wireless access equipment AP_c1 and the path from the wireless access equipment AP_c5 to the wireless access equipment AP_c3 may be temporally forbade. Thereby, the wireless access equipment AP_c1 and AP_c2 may ensure to prioritize performing signal exchanges with the wireless access equipment AP_c9, such that the user equipment in the region Z1 may preferentially perform the data exchanges by the router 200. On the other sides, controlling the wireless access equipment AP_c4 to connect to the wireless access equipment AP_c9 only through the wireless access equipment AP_c3, or allowing the wireless access equipment AP_c4 to directly connect to the wireless access equipment AP_c9 under specific applications may also facilitate the wireless access equipments AP_c1 and AP_c2 to prioritize providing the wireless services for the user equipment in the region Z1.

Notably, the mesh routing adjustment in FIG. 5 is utilized for ensuring that the wireless access equipments AP_c1 and AP_c2 may prioritize providing the wireless services for the user equipment in the region Z1, which is not limited hereinafter. For example, in another embodiment, in addition to directly connect to the wireless access equipment AP_c9, the wireless access equipment AP_c1 may also connect to the wireless access equipment AP_c9 through the wireless access equipment AP_c3, and the wireless access equipment AP_c3 is configured to prioritize performing the signals from the wireless access equipments AP_c1 and AP_c2. In addition, the wireless access equipment AP_c4 may also be controlled to connect to the wireless access equipment AP_c3. All of the above belong to the scope of the present invention.

Figure 6:
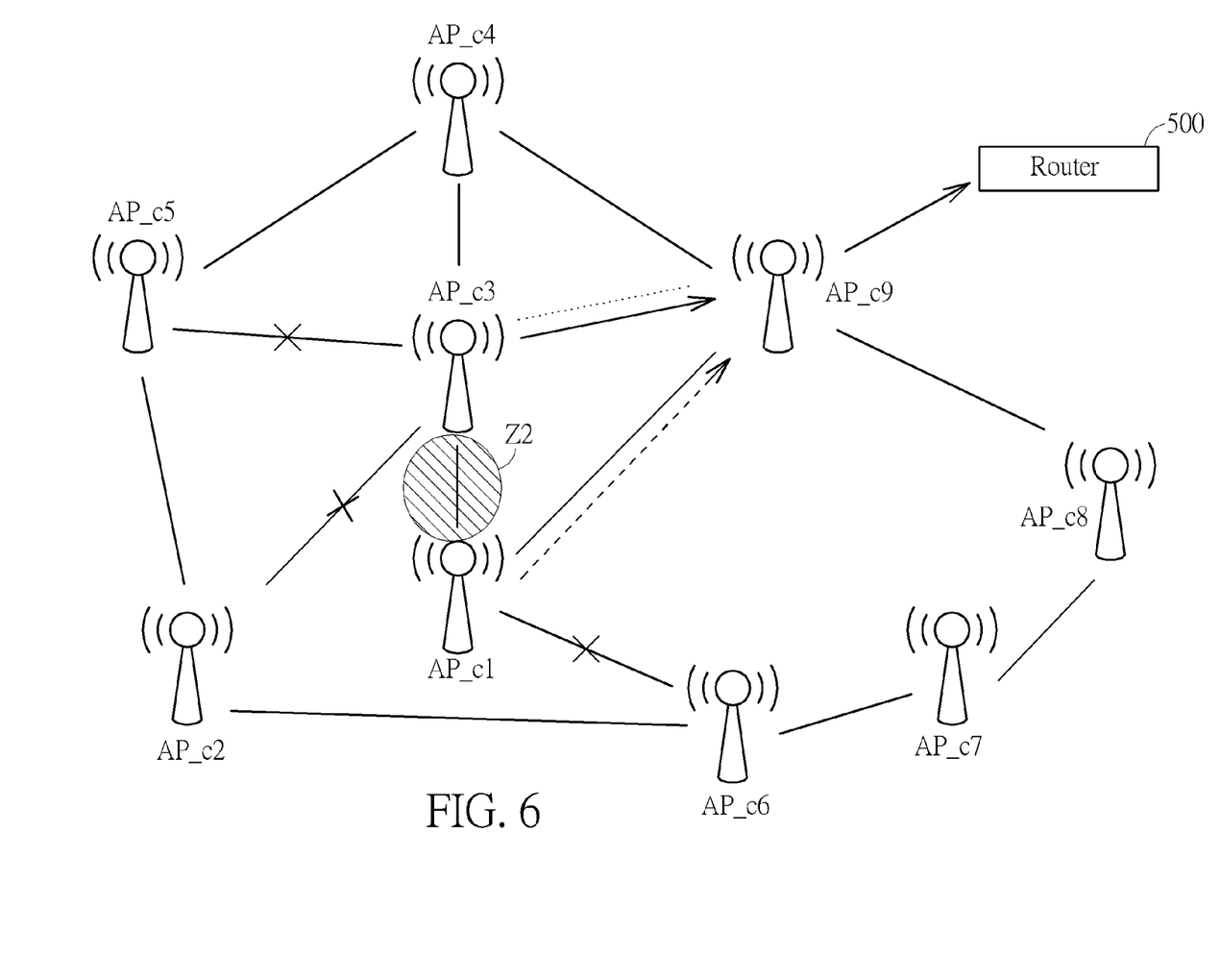

Furthermore, please refer to FIG. 6, if the user equipment in the region Z1 moves toward a region Z2, according to the embodiment of the present invention, since the wireless access equipment AP_c3 is close to the region Z2, the network managing device 100 may control the wireless access equipment AP_c3 instead of the wireless access equipment AP_c2 to prioritize providing the wireless services for the user equipment in the region Z2 according to the movements of the user equipment. Additionally, the network managing device 100 may also adjust the beam-forming methods of the wireless access equipments AP_c1 and AP_c3 to adjust the wireless signal beams of the wireless access equipments AP_c1 and AP_c3 to substantially point toward the region Z2. Under such a situation, for ensuring that the user equipment in the region Z2 may preferentially perform the data exchanges by the router 200, the network managing device 100 may further increase the routing priority of the path from the wireless access equipment AP_c1 to the wireless access equipment AP_c9 (i.e. the dashed line path in FIG. 6) and the path from the wireless access equipment AP_c3 to the wireless access equipment AP_c9 (i.e. the dotted line path in FIG. 6). Additionally, the path from the wireless access equipment AP_c6 to the wireless access equipment AP_c1, the path from the wireless access equipment AP_c2 to the wireless access equipment AP_c3, and the path from the wireless access equipment AP_c5 to the wireless access equipment AP_c3 may also be temporally forbade. Thereby, the wireless access equipments AP_c1 and AP_c3 may ensure to prioritize performing signals exchanges with the wireless access equipment AP_c9, such that the user equipment in the region Z2 may preferentially perform the data exchanges by the router 200.

In the above embodiment, the network managing device 100 determines the locations or the movement situations of the user equipments CLT_1-CLT_m according to the echo back time measured by the wireless access equipments AP_1-AP_n. Then, the network managing device 100 accordingly adjusts the wireless operations of the wireless access equipments AP_1-AP_n to prioritize providing the wireless services for the user equipment with higher priority. However, in addition to adjust the wireless operations of the wireless access equipments AP_1-AP_n passively according to the movement situations, the network managing device 100 of the present invention may also actively adjust the wireless operations of the wireless access equipments AP_1-AP_n in other embodiments. That is, when the network managing device 100 detects that the user equipment, which is required to be preferentially serviced, moves from a region to another region, the network managing device 100 may previously adjust the wireless operations of the wireless access equipments AP_1-AP_n to deal with the movement situation of the user equipment. The detecting methods may be based on the movement of the user equipment (such as the moving speed or the moving direction, etc.) or based on a predefined path configuration data.

For example, as shown in FIG. 5 and FIG. 6, if the network managing device 100 determines that the user equipment in the region Z1 starts moving to the region Z2 according to the measurement results of the wireless access equipments AP_1-AP_n, the network managing device 100 may previously adjust the wireless operations of the wireless access equipments AP_c1-AP_c9 to be the situation in FIG. 6. Moreover, if a path configuration data indicates that the user equipment in the region Z1 is scheduled to move to the region Z2 at a specific time, the network managing device 100 may adjust the wireless operations of the wireless access equipments AP_c1-AP_c9 to be the situations in FIG. 6 before or just at the specific time. As a result, the network managing device 100 may previously adjust the wireless operations of the wireless access equipments AP_c1-AP_c9 according to the possible movement situations of the user equipment to improve the network efficiency.

Figure 7A:
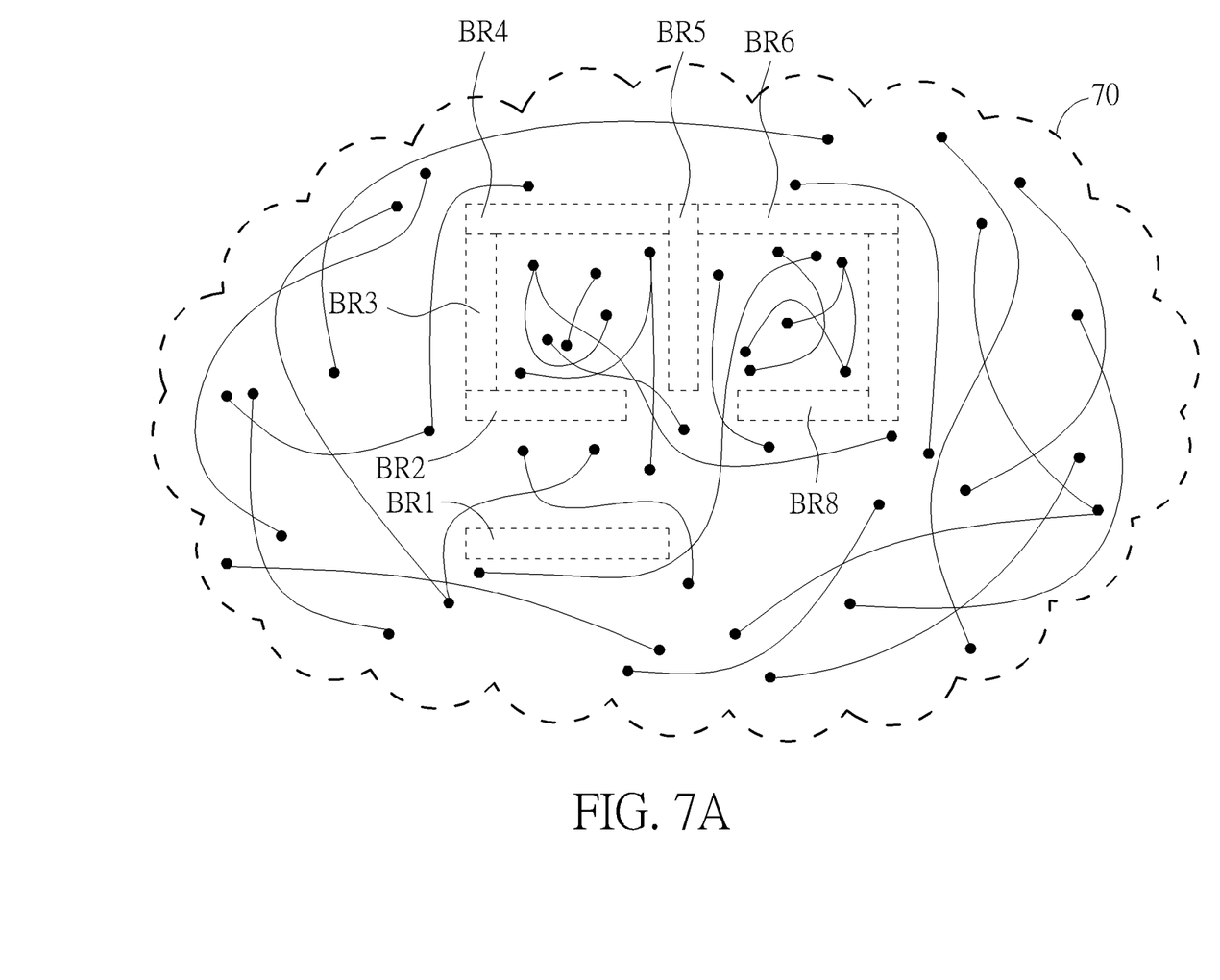
Figure 7B:
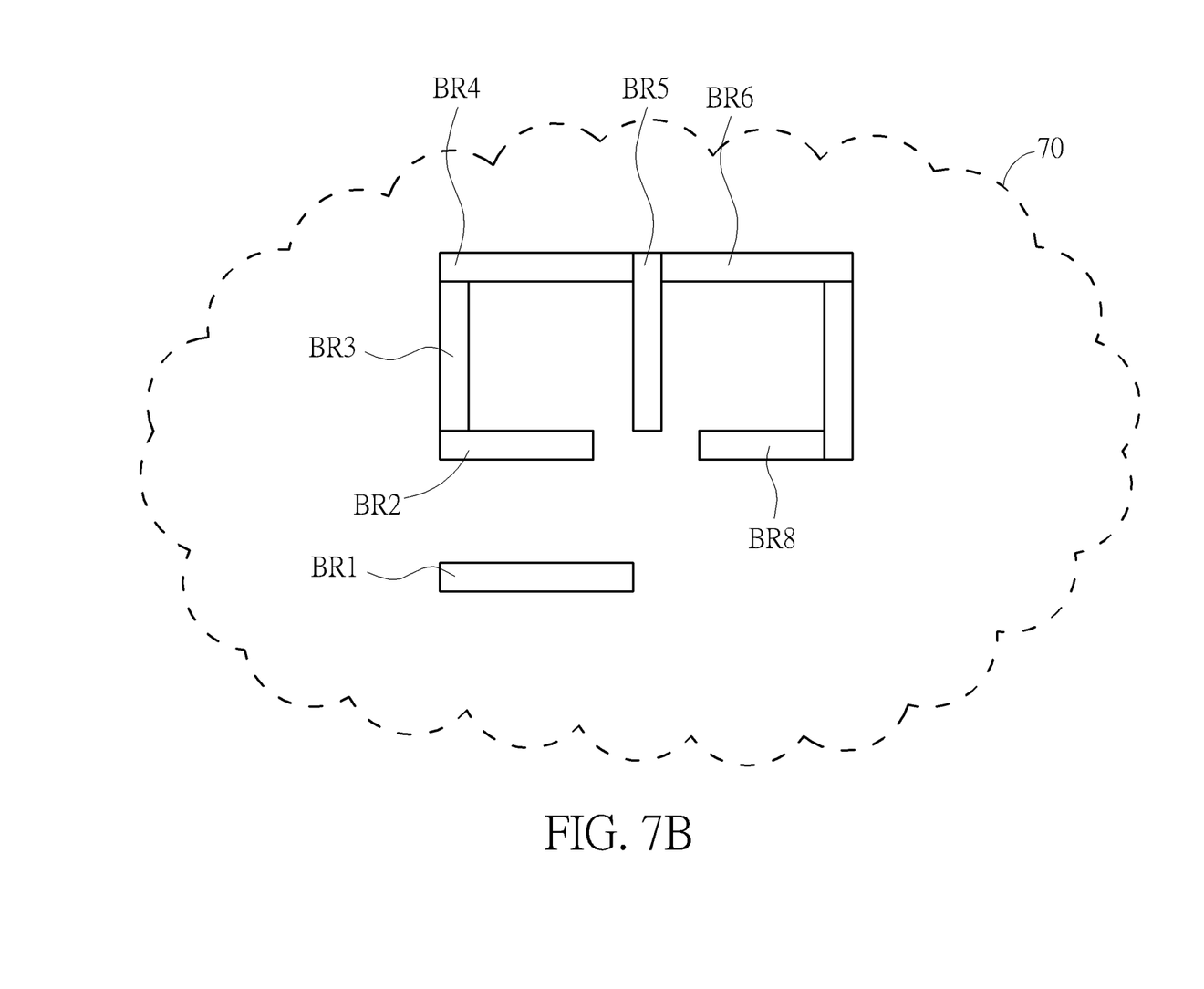
Figure 7C:
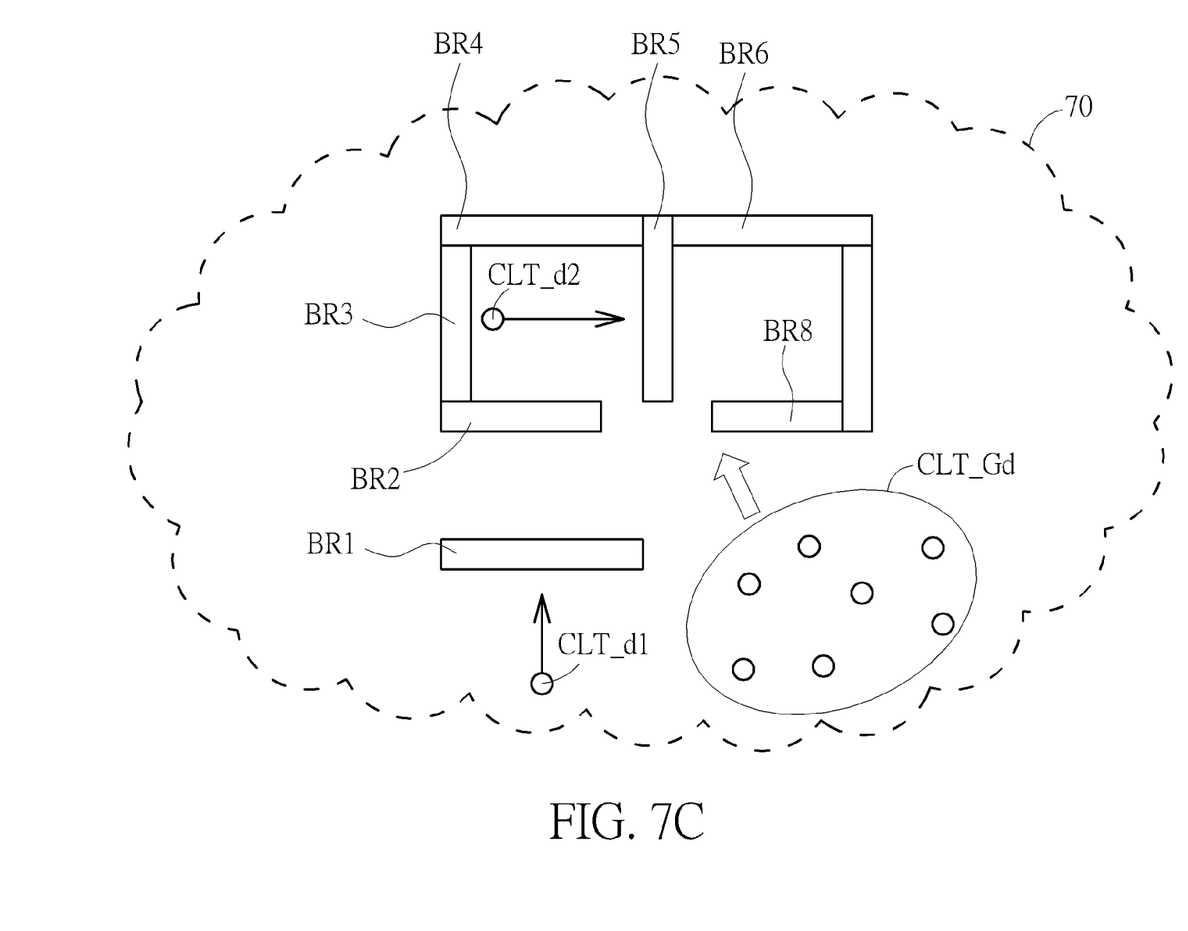

On the other hands, in the wireless network system 10, with a continuous increase of the obtained movement situations of the user equipments CLT_1-CLT_m, the network managing device 100 may accordingly determine building shields in a signal coverage of the wireless network system 10 to further adjust the wireless operations of the wireless access equipments AP_1-AP_n. For example, please refer to FIG. 7A, which is a schematic diagram of a signal coverage 70 of the wireless network system 10. In FIG. 7A, the solid lines represent the movement situations of the user equipments CLT_1-CLT_m, which are statistically analyzed by the network managing device 100 and are the normal moving situations of the user equipments CLT_1-CLT_m in the signal coverage 70. The network managing device 100 may analyze the movement types of the user equipments CLT_1-CLT_m (such as to avoid or to bypass some certain regions) according to the normal moving situations of the user equipments CLT_1-CLT_m, so as to determine building shields BR1-BR8 in the signal coverage 70, i.e. shown in FIG. 7B. When the building shields BR1-BR8 are determined, the network managing device 100 further determines moving trends of the user equipments CLT_1-CLT_m accordingly to adjust the wireless operations of the wireless access equipments AP_1-AP_n. For example, in FIG. 7C, if a user equipment CLT_d1 with higher priority move toward the building shield BR1, the network device 100 may determine that the user equipment CLT_d1 may bypass the building shield BR1, and the wireless signal beams are not required to be adjusted to point to the building shield BR1. If another user equipment CLT_d2 with higher priority is located in a region surrounded by the building shield BR2-BR5, the network device 100 may determine that the user equipment CLT_d2 may stay in the region or move to an outside of the region from the gap between the building shield BR2 and BR5, and the network device 100 may prepare for the two situations in advance. Furthermore, if a user equipment group CLT_Gd with higher priority moves to a region surrounded by the building shields BR5-BR8 at a specific time, the network managing device 100 determines that the user equipment group CLT_Gd may only move into the region surrounded by the building shields BR5-BR8 from the gap between the building shield BR5 and BR7, and the network device 100 may prepare for the movement situation in advance.

As can be seen, the embodiments of the present invention may determine the locations or the movement types of the user equipments CLT_1-CLT_m according to the echo back time measured by the wireless access equipments AP_1-AP_n to actively or passively adjust the wireless operations of the wireless access equipments AP_1-AP_n for the specific user equipments with higher priority. Notably, the above embodiments are utilized for explaining the present invention, and any alternations according to the above embodiments all belong to the scopes of the present invention. For example, the determination of the echo back time is not limited by the beacons and the corresponding response signals. Packages or signals of other types may also be utilized in the present invention for the determination of the echo back time, which are not limited hereinafter. In general, the beacons are periodically outputted from the wireless access equipments AP_1-AP_n to determine whether the wireless connections are normally working. In one embodiment, the network managing device 100 may also control the wireless access equipments AP_1-AP_n to output the specific packages for accordingly determining the echo back time and the locations of user equipments. Furthermore, the number n of the wireless access equipments AP_1-AP_n is required to be greater than or equal to 3 to correctly perform the triangulation method, and the network device 100 may previously obtain the locations of the wireless access equipments AP_1-AP_n. In addition to adjusting the beam-forming methods and the mesh routing methods of the wireless access equipments AP_1-AP_n, the network device 100 may also prioritize providing the wireless services for the specific user equipments by adjusting the operating powers of the wireless access equipments AP_1-AP_n or by other methods, etc.

On the other hands, the determining or configuring methods of the priority are also not limited to specific rules. For example, in one embodiment, a priority configuration table may be previously stored in the storage device 104 of the network managing device 100 to record the media access control (MAC) addresses and the priorities of the specific user equipments. When any user equipment moves into the signal coverage of the wireless network system 10 to establish the connections with the specific wireless access equipments, the network managing device 100 may determine the priority of the user equipment according to the priority configuration table. Moreover, in another embodiment, the priorities may also be related to the locations of the regions; that is, the network managing device 100 may control the wireless access equipments AP_1-AP_n to prioritize providing the wireless services for the user equipment located in the specific region. All of the above belong to the scope of the present invention.

The prior art may not adaptively provide the wireless services for the user equipments with different priorities. In comparison, the present invention may actively or passively provide the proper wireless services according to the locations, the priorities, or the movement types, etc. to provide a convenient network environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network managing method for a wireless network system, wherein the wireless network system comprises a plurality of wireless access equipments and a plurality of user equipments, the network managing method comprising:
    measuring, by the plurality of wireless access equipments, a plurality of echo back time of the plurality of user equipments to obtain a plurality of measurement results;
    determining locations of the plurality of user equipments according to the plurality of measurement results and locations of the plurality of wireless access equipments; and
    adjusting wireless operations from the plurality of wireless access equipments to the plurality of user equipments according to the locations and priorities of the plurality of user equipments.

2. The network managing method of claim 1, wherein a number of the plurality of wireless access equipments is greater than or equal to 3.

3. The network managing method of claim 1, wherein the plurality of echo back time are periods between the plurality of wireless access equipments outputting a plurality of beacons to the plurality of user equipments and the plurality of wireless access equipments receiving a plurality of response signals corresponding to the plurality of beacons from the plurality of user equipments.

4. The network managing method of claim 1, wherein adjusting the wireless operations from the plurality of wireless access equipments to the plurality of user equipments comprises adjusting beam forming methods and mesh routing methods of the plurality of wireless access equipments for the plurality of user equipments.

5. The network managing method of claim 1, wherein the step of adjusting the wireless operations from the plurality of wireless access equipments to the plurality of user equipments according to the locations and the priorities of the plurality of user equipments comprises:
    controlling the plurality of wireless access equipments to prioritize providing wireless services for a user equipment of the plurality of user equipments when a priority of the user equipment is greater than a predefined degree.

6. The network managing method of claim 1, further comprising:
    determining movement situations of the plurality of user equipments according to the plurality of measurement results; and
    adjusting the wireless operations from the plurality of wireless access equipments to the plurality of user equipments according to the movement situations and the priorities of the plurality of user equipments.

7. The network managing method of claim 6, wherein the step of adjusting the wireless operations from the plurality of wireless access equipments to the plurality of user equipments according to the movement situations and the priorities of the plurality of user equipments comprises:
    controlling the plurality of wireless access equipments to prioritize providing wireless services for a user equipment of the plurality of user equipments when a priority of the user equipment is greater than a predefined degree and the user equipment moves toward a region.

8. The network managing method of claim 1, further comprising:
    receiving a path configuration data; and
    adjusting the plurality of wireless access equipments to prioritize providing wireless services for a region within a period when the path configuration data indicates that the plurality of user equipments moves to the region within the period.

9. The network managing method of claim 1, further comprising:
    determining normal moving situations of the plurality of user Equipments in a signal coverage of the wireless network system according to the plurality of measurement results;
    determining at least one building shield in the signal coverage according to the normal moving situations of the plurality of user equipments in the signal coverage of the wireless network system; and
    determining moving trends of the plurality of user equipments according to the at least one building shield and the locations of the plurality of user equipments to adjust the wireless operations from the plurality of wireless access equipments to the plurality of user equipments.

10. A network managing device for a wireless network system, wherein the wireless network system comprises a plurality of wireless access equipments and a plurality of user equipments, the network managing device comprising:
a processor; and
a memory for storing a program code to manage the wireless network system,
wherein the program code instructs the processor to perform following steps:
controlling the plurality of wireless access equipments to measure a plurality of echo back time of the plurality of user equipments to obtain a plurality of measurement results;
determining locations of the plurality of user equipments according to the plurality of measurement results and locations of the plurality of wireless access equipments; and
adjusting wireless operations from the plurality of wireless access equipments to the plurality of user equipments according to the locations and priorities of the plurality of user equipments.

11. The network managing device of claim 10, wherein a number of the plurality of wireless access equipments is greater than or equal to 3.

12. The network managing device of claim 10, wherein the plurality of echo back time are periods between the plurality of wireless access equipments outputting a plurality of beacons to the plurality of user equipments and the plurality of wireless access equipments receiving a plurality of response signals corresponding to the plurality of beacons from the plurality of user equipments.

13. The network managing device of claim 10, wherein adjusting the wireless operations from the plurality of wireless access equipments to the plurality of user equipments comprises adjusting beam forming methods and mesh routing methods of the plurality of wireless access equipments for the plurality of user equipments.

14. The network managing device of claim 10, wherein the step of adjusting the wireless operations from the plurality of wireless access equipments to the plurality of user equipments according to the locations and the priorities of the plurality of user equipments comprises:
controlling the plurality of wireless access equipments to prioritize providing wireless services for a user equipment of the plurality of user equipments when a priority of the user equipment is greater than a predefined degree.

15. The network managing device of claim 10, wherein the program code indicates to the processor to further perform following step:
determining movement situations of the plurality of user equipments according to the plurality of measurement results; and
adjusting the wireless operations from the plurality of wireless access equipments to the plurality of user equipments according to the movement situations and the priorities of the plurality of user equipments.

16. The network managing device of claim 15, wherein the step of adjusting the wireless operations from the plurality of wireless access equipments to the plurality of user equipments according to the movement situations and the priorities of the plurality of user equipments comprises:
controlling the plurality of wireless access equipments to prioritize providing wireless services for a user equipment of the plurality of user equipments when a priority of the user equipment is greater than a predefined degree and the user equipment moves toward a region.

17. The network managing device of claim 10, wherein the program code indicates to the processor to further perform following step:
receiving a path configuration data; and
adjusting the plurality of wireless access equipments to prioritize providing wireless services for a region within a period when the path configuration data indicates that the plurality of user equipments moves to the region within the period.

18. The network managing device of claim 10, wherein the program code indicates to the processor to further perform following step:
determining normal moving situations of the plurality of user equipments in a signal coverage of the wireless network system according to the plurality of measurement results;
determining at least one building shield in the signal coverage according to the normal moving situations of the plurality of user equipments in the signal coverage of the wireless network system; and
determining moving trends of the plurality of user equipments according to the at least one building shield and the locations of the plurality of user equipments to adjust the wireless operations from the plurality of wireless access equipments to the plurality of user equipments.

* * * * *